US006843911B2

(12) United States Patent
Janik et al.

(10) Patent No.: US 6,843,911 B2
(45) Date of Patent: Jan. 18, 2005

(54) BASE RECEPTACLE WITH FIXED RETAINER FOR FILTER CARTRIDGE INCORPORATING A PERIPHERAL COMPATIBILITY MATRIX

(75) Inventors: Leon P. Janik, Suffield, CT (US); Michael J. Williams, Glastonbury, CT (US)

(73) Assignee: Stanadyne Corporation, Windsor, CT (US)

( * ) Notice: Subject to any disclaimer, the term of this patent is extended or adjusted under 35 U.S.C. 154(b) by 168 days.

(21) Appl. No.: 10/284,695

(22) Filed: Oct. 31, 2002

(65) Prior Publication Data

US 2004/0084361 A1 May 6, 2004

(51) Int. Cl.[7] .............................................. B01D 27/08
(52) U.S. Cl. ........................ 210/232; 210/249; 210/443; 285/396; 285/402; 285/914
(58) Field of Search .............................. 210/232, 249, 210/440, 443, 444; 285/331, 361, 396, 402, 914

(56) References Cited

U.S. PATENT DOCUMENTS

| | | | |
|---|---|---|---|
| 4,719,012 A | 1/1988 | Groezinger et al. | 210/232 |
| 5,035,797 A | 7/1991 | Janik | 210/232 |
| 5,766,463 A | 6/1998 | Janik et al. | 210/232 |
| 5,837,137 A | 11/1998 | Janik | 210/232 |
| 6,139,738 A | 10/2000 | Maxwell | 210/248 |
| 6,187,188 B1 | 2/2001 | Janik et al. | 210/232 |
| 6,458,269 B1 * | 10/2002 | Bassett et al. | 210/119 |
| 6,500,335 B2 * | 12/2002 | Janik et al. | 210/232 |
| 6,695,891 B2 | 2/2004 | Reid | 55/495 |

FOREIGN PATENT DOCUMENTS

| | | |
|---|---|---|
| EP | 0 783 913 | 7/1997 |
| EP | 1 070 530 | 1/2001 |
| EP | 1 126 159 | 8/2001 |
| EP | 1 127 602 | 8/2001 |
| EP | 1 128 060 | 8/2001 |
| WO | WO 01/80967 | 11/2001 |

OTHER PUBLICATIONS

International Search Report PCT/US 03/33350, dtd. Oct. 21, 2003.

* cited by examiner

Primary Examiner—Matthew O. Savage
(74) Attorney, Agent, or Firm—Alix, Yale & Ristas, LLP

(57) ABSTRACT

A filter assembly employs radially inwardly and outwardly displaced portions of a peripheral roll seam on the cartridge as components of a cartridge compatibility matrix. A base defines an axial entrance to a fixed retainer that is complementary to the compatibility matrix of the cartridge roll seam. Axial slots accommodate the outwardly displaced portions of the roll seam while inward protrusions correspond to the location and inward displacement of the inwardly displaced segments of the roll seam. Incompatible filter cartridges are prevented from axial reception into the base. The number, configuration and location of inwardly and outwardly displaced portions of the roll seam may be varied to provide a variety of unique compatibility matrices.

21 Claims, 7 Drawing Sheets

BASE RECEPTACLE WITH FIXED RETAINER FOR FILTER CARTRIDGE INCORPORATING A PERIPHERAL COMPATIBILITY MATRIX

BACKGROUND OF THE INVENTION

1. Field of the Invention

This invention relates generally to fuel filters employed in connection with internal combustion engines. More particularly, the present invention relates to a base receptacle which receives a replaceable fuel filter cartridge to form a filter assembly for removing foreign particles and/or separating water from the fuel supply system of an internal combustion engine.

2. Description of the Related Art

Fuel filter systems to which the invention relates commonly employ a disposable filter cartridge that is replaced at pre-established intervals of filter usage. The replaceable cartridge is conventionally secured to a base that defines inlet and outlet connections between the cartridge and the fuel supply system. Numerous retention systems have been employed for securing the filter cartridge to the base and allowing removal of the cartridge for replacement purposes.

In practice, filter cartridge requirements may vary depending upon: the type and make of the internal combustion engine; the specific application for which the engine is employed; the climate in which the engine is operated; and/or regional characteristics as to the quality of the fuel supply. Filter cartridges suitable for replacement in a particular filtration system, commonly vary as to capacity, fluid compatibility and filter media qualities.

One of the recurring problems in assuring filtration system performance is encountered in connection with replacement of the filter cartridge. It is imperative that the replacement cartridge be compatible with the filtering requirements for the fuel system. It is common for filter cartridges to have a generally similar exterior configuration regardless of performance. As a result, a replacement filter cartridge may dimensionally conform to the base of a given fuel filter assembly, and not comply with the applicable specifications for the fuel system and thereby jeopardize the integrity of the fuel filtering system. Replacement with an incompatible filter cartridge can have very serious consequences for the operation of the internal combustion engine and may also be unnecessarily more expensive than less costly cartridges which are fully suitable. In practice, replacement cartridges may be so similar in overall configuration that the owner of the vehicle and/or the maintenance technician servicing the internal combustion engine may unknowingly jeopardize the integrity of the filtering system by replacement with a wholly unsuitable cartridge even though the unsuitable cartridge at least cursorily appears to be suitable. There are also, of course, instances where inferior or improper replacement filter cartridges are intentionally installed without the knowledge of the owner of the operator of the vehicle.

For many applications, it is also desirable that a cartridge be mounted to the base at a specific angular orientation so that warnings, directions and markings affixed to the cartridge may be properly positioned to ensure visibility and maximize the chances of successful information dissemination. For other applications, it is desirable that the cartridge be locked in position relative to the base such that the cartridge may not rotate with relation to the base.

U.S. Pat. No. 5,035,797, which is assigned to the assignee of the present invention, discloses a fuel filter assembly in which a base mounts to the vehicle and a disposable filter cartridge is suspended from the base. The cartridge is retained to the base by a threaded collar that engages against a protruding roll seam structure at the periphery of the cartridge housing. The cartridge is replaced by loosening the threaded collar and dismounting the filter cartridge. A key system is disclosed in which keys axially project from the base through corresponding slots in the end cap of the filter cartridge housing. The dimensions and location of the axially projecting keys ensure compatibility by interfering with mounting and sealing of incompatible cartridges lacking the correct slot configuration. The keys interlock with the slots to mount the cartridge at a fixed angular relationship to the base.

U.S. Pat. No. 5,837,137, which is assigned to the assignee of the present invention, discloses a similarly configured fuel filtration assembly (e.g., the cartridge is retained to the base by a threaded collar) incorporating an alternative location and key system. Protrusions from a receiving surface of the base are received in corresponding dimples in the opposing end surface of the cartridge to lock the cartridge at a fixed angular position relative to the base. The protrusions interfere with the mounting and sealing of a non-compatible cartridge having an incompatible pattern of dimples.

A further variation on ensuring compatibility in fuel filtration assemblies similar to those described above is disclosed in U.S. Pat. No. 5,766,463, which is assigned to the assignee of the present invention. The disclosed fuel filter cartridge is formed from a pair of shell sections joined along a roll seam to form the retaining shoulder. The generally cylindrical upper portion of the filter cartridge is received within the base. A plurality of arcuate protrusions radially project from the cylindrical upper portion of the cartridge to be received in compatible tracks in the base. The protrusions are disclosed as part of a key code system including the key/slot system described in the '797 patent. A keying system that relies on protrusions from the received portion of the cartridge housing may permit defeat of the keying system by allowing a cartridge without the protrusions to be received in the keyed base without interference.

An alternative filter cartridge mounting system is disclosed in U.S. Pat. No. 6,187,188, also assigned to the assignee of the present invention. The roll seam at the junction of the cartridge housing sections is radially outwardly displaced to form a plurality of retention tabs. The base includes a fixed retaining structure comprising a retaining lip defining a plurality of axial slots in communication with retaining channel portions above the retaining lip. The axial slots are located and dimensioned to be complementary to the retaining tabs of the filter cartridge. The filter cartridge is retained to the base by axially aligning the tabs with the slots and upwardly displacing the cartridge into the receptacle of the base. The cartridge is then rotated so that the tabs are engaged within the retaining channel portions. The '188 patent discloses that compatibility of the cartridge with the base may be ensured by providing the received portion of the cartridge with arcuate slots to accommodate keys axially projecting, from the base as disclosed in the '797 patent. Alternatively, the received portion of the cartridge may be provided with radial protrusions such as those disclosed in the '463 patent. Tracks in the base for receiving the protrusions must be L-shaped (have an axial portion and a radial portion) to accommodate rotation of the cartridge relative to the base.

Ensuring filter cartridge compatibility is an issue of continuing concern in the art. While the approaches to ensuring filter cartridge compatibility described in the '797, '137, '463, and '188 patents represent significant advances over the prior art, further improvements in effectiveness and efficiency are possible. For example, keys projecting from the base that require openings in the filter cartridge compromise the sealed integrity of the filtration system. Keying arrangements that restrict the cartridge to a fixed angular position relative to the base are incompatible with filter assemblies that require rotation of the cartridge relative to the base. The L-shaped tracks disclosed in the '188 patent may be difficult to produce, thereby increasing the cost of filter assemblies.

There is an ongoing need in the art for a filter assembly that prevents installation of incompatible filter cartridges. Ideally, a filter cartridge compatible with such a key system may be employed with a filter assembly in which the cartridge is retained to the base by a collar and filter assemblies in which the cartridge is rotated to engage radially projecting tabs in a retainer fixedly extending from the base.

SUMMARY OF THE INVENTION

Briefly stated, the invention relates to a filter assembly that includes a replaceable filter cartridge with a convoluted peripheral roll seam connecting a cartridge housing end cap to a housing second section. The convoluted roll seam provides a peripheral compatibility matrix associated with the cartridge. A base component is configured to axially receive the cartridge housing end cap into a receptacle and convoluted roll seam into a fixed retainer. Angular rotation of a received cartridge relative to the base engages outwardly displaced portions of the roll seam in retaining channel portions of the fixed retainer. An interrupted retainer lip is configured to block axial reception of cartridges lacking the correct peripheral compatibility matrix as defined by the convoluted roll seam.

In accordance with one aspect of the present invention, each cartridge configuration may be associated with a unique peripheral compatibility matrix including roll seam portions that are outwardly and inwardly displaced relative to a circle defined by the remainder of the roll seam. The inwardly and outwardly displaced portions of the roll seam change the radial distance between the outer profile of the roll seam and a central axis of the filter cartridge.

Another aspect of the invention relates to a base component with a fixed retainer in which retainer lip portions define an axial passage that tracks the exterior profile of the convoluted roll seam so as to prevent axial reception of an incompatible cartridge. The retainer lip portions are arranged to define gaps that provide axial passageways for the outwardly displaced portions of the roll seam. An inward facing profile of the retainer lip portions includes inward facing protrusions corresponding to the inwardly displaced segments of the roll seam. The arrangement and configuration of the retainer lip portions effectively codes the fixed retainer of the base component to a filter cartridge with a particular peripheral compatibility matrix.

The filter cartridge housing may be substantially symmetric about a central axis with three equal size outwardly displaced portions equiangularly arranged about the cartridge axis. These outwardly displaced portions serve as retaining tabs when axially aligned with and angularly rotated into retaining channel portions defined by a fixed retainer of a base component. Between the retention tabs, the roll seam includes three substantially equal length portions of substantially equal radii of curvature. In accordance with a further aspect of the invention, one or more of the roll seam portions between the retention tabs may include a segment that is inwardly displaced relative to the remainder of the roll seam. The number, dimensions and arrangement of the inwardly and outwardly displaced portions of the roll seam may be altered to ensure cartridge/base compatibility and index a received cartridge to a particular rotational position when mated to the base.

In a base with a fixed retainer where the retention tabs are axially received through slots between retainer lip portions and the cartridge secured to the base by rotation relative to the base, compatibility is ensured by inward protrusions on the retainer lip portions. The inward protrusions from the retainer lip portions are arranged to correspond to the location and radial dimension of the inwardly displaced segments of the roll seam. The peripheral compatibility matrix defined by a roll seam of a compatible filter cartridge will pass through the complementary matrix defined by the retainer lip portions and inward protrusions of the fixed retainer. The roll seam of an incompatible filter cartridge lacking the correct arrangement of retention tabs and inwardly displaced portions of the roll seam is prevented from axial reception into the base. In one peripheral compatibility matrix, the roll seam includes three equiangularly spaced retention tabs and three equiangularly spaced inwardly displaced segments of the roll seam. Alternatively, one or more of the inwardly displaced segments may be omitted to ensure a particular installed orientation of the cartridge relative to the base.

In addition, the filter cartridge may also comprise at least one outward protrusion from the side wall of the cartridge housing end cap received in the base receptacle. A ring surrounding the entrance to the receptacle defines axial openings compatible with the protrusions on the cartridge housing end cap. Together, the configuration of the roll seam and the received portion of the cartridge may be incorporated into multiple levels of keying for cartridge identification, cartridge positioning and quality control purposes.

An object of the present invention is to provide a new and improved filter cartridge compatibility matrix.

Another object of the present invention is to provide a new and improved filter cartridge structure that ensures compatibility in filter assemblies having fixed cartridge-retention systems.

A further object of the present invention is to provide a new and improved filter assembly in which compatibility protection cannot be defeated by omission of the compatibility matrix structure from a replacement cartridge.

Other objects and advantages of the invention will become apparent from the drawings and the specification.

BRIEF DESCRIPTION OF THE DRAWINGS

The present invention may be better understood and its numerous objects and advantages will become apparent to those skilled in the art by reference to the accompanying drawings in which.

DETAILED DESCRIPTION OF THE PREFERRED EMBODIMENTS

A filter cartridge compatible with a filter base in accordance with the present invention will be described with reference to FIGS. 1–5 and is generally designated by the numeral 10. An embodiment of a filter base component compatible with the cartridge of FIGS. 1–5 is shown in FIGS. 6–11 and is generally designated by the numeral 40.

Figure 1:
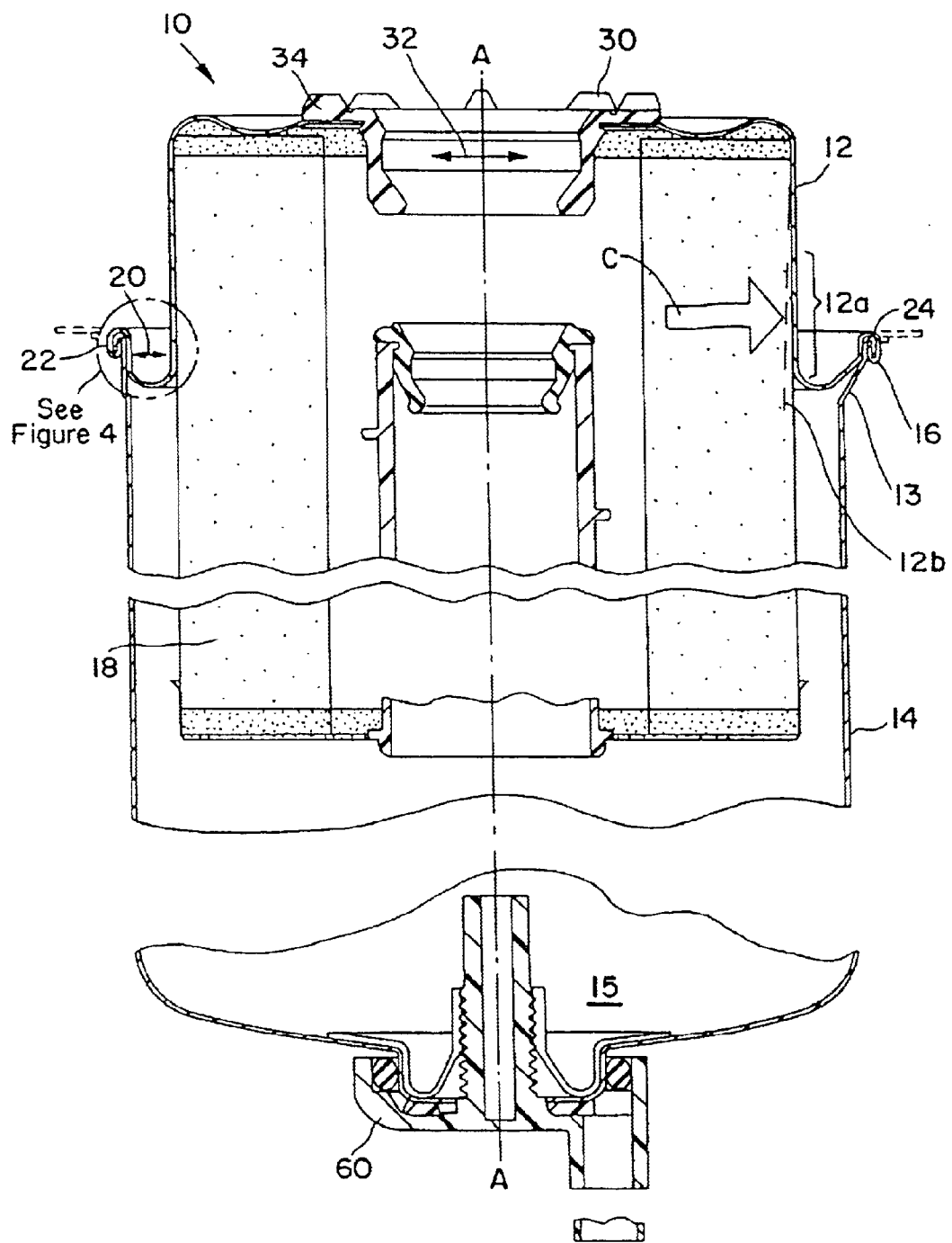
FIG. 1 is a vertical sectional view, partly broken away, of a fuel filter cartridge incorporating a compatibility matrix exemplary of several aspects of the present invention.
Figure 4:
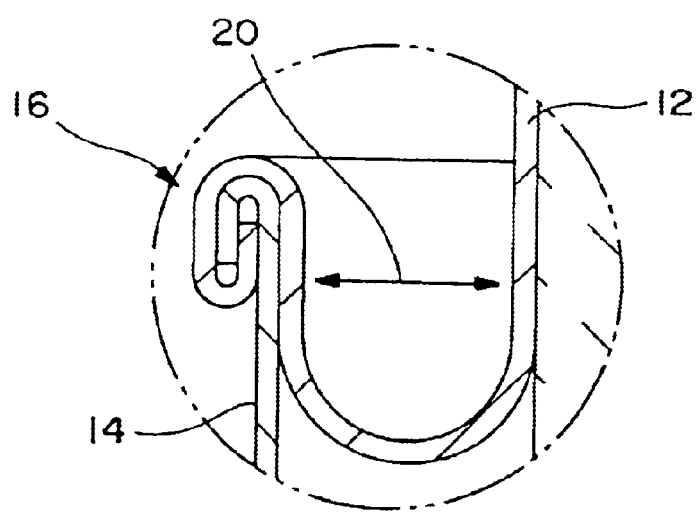
FIG. 4 is an enlarged sectional view through the roll seam at the left side of the filter cartridge of FIG. 1.

FIG. 1 is a sectional view through a filter cartridge 10 comprising a cartridge housing end cap 12 joined to a housing second section 14 along a peripheral roll seam 16. FIG. 4 illustrates an enlarged sectional view through the roll seam 16 on the left hand side of FIG. 1. The sheet metal of the respective housing sections which forms the roll seam is shown as dotted lines to the left and right of the filter cartridge 10 adjacent the roll seam in FIG. 1. The sheet metal extending from the cartridge housing end cap 12 extends radially beyond the sheet metal extending from the housing second section 14. When rolled together to form the roll seam shown in FIG. 4, the extended radial length of the sheet metal of the end cap 12 is rolled under and overlaps the sheet metal of the housing second section 14. The rolled, overlapping sheet metal is then crimped to form the roll seam in a manner known in the art. A U-shaped bend in the end cap 12 inwardly of the roll seam defines a space 20 between the roll seam and the generally cylindrical wall of the end cap 12. This space 20 allows access to the interior of the roll seam 16 during seam formation and for the purposes of deformation as will be discussed below.

The filter cartridge 10 has an overall general configuration and functionality that is well understood by those of skill in the art. The end cap 12 is smaller in diameter than the housing second section 14. A filter element 18 is supported within the filter cartridge and closely surrounded by the end cap. The sealing grommet 30 is mounted in a central axial opening 32 through an upper end wall of the end cap 12. The sealing grommet 30 in typical fashion inwardly seals against an outer fluid conduit 48 of the base 40. A further base component (not shown) includes a coaxial conduit extending through the opening 45 defined by the outer fluid conduit 48. These coaxial conduits deliver unfiltered fluid and retrieve filtered fluid from the filter cartridge 10. Water may collect in a sump 15 at the bottom of the cartridge 10 and be removed through a drain cock 60. None of the interior structures are specifically part of the invention. The interior structure of the cartridge may, for example, be similar in form and function to that described in U.S. Pat. Nos. 5,302,284, 5,614,091, and 5,766,463.

Figure 2:
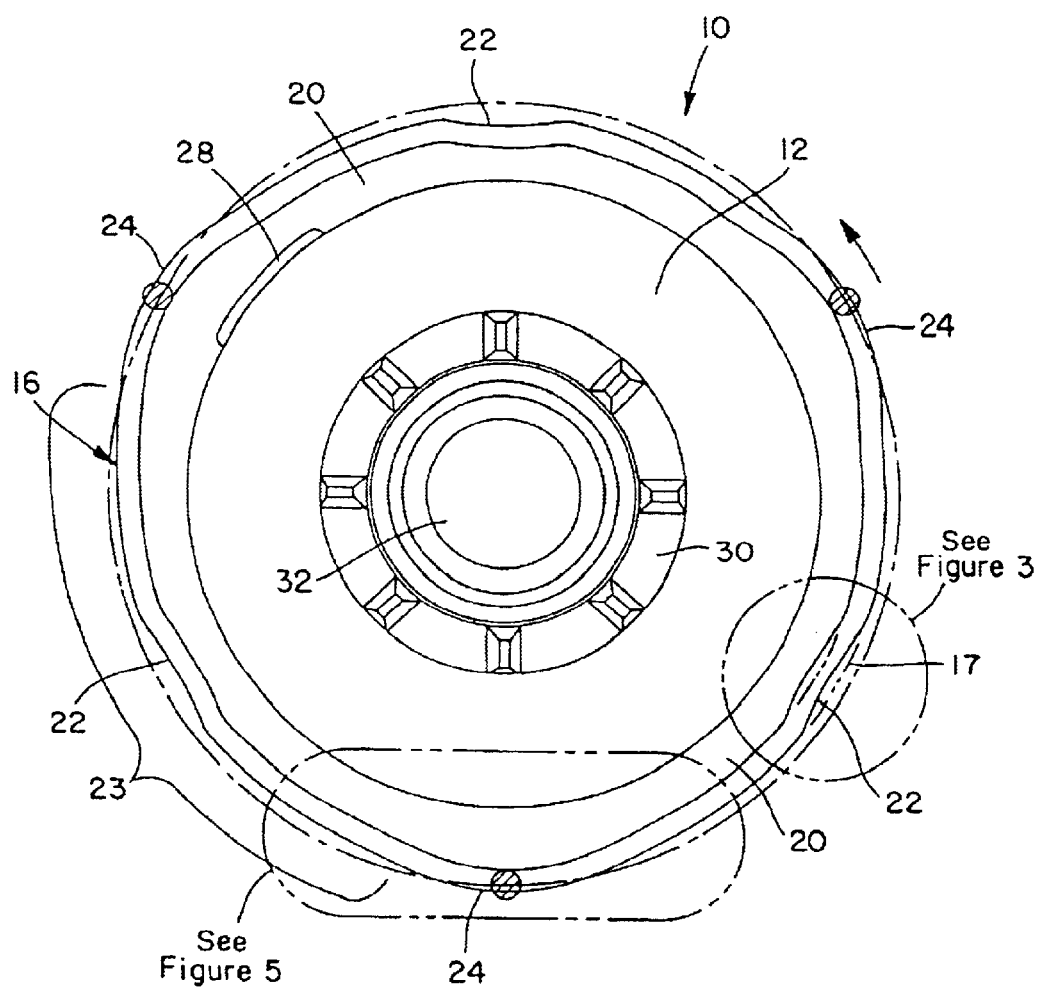
FIG. 2 is a top plan view, partly in diagrammatic form, of the filter cartridge of FIG. 1.

FIG. 2 is a top view of the filter cartridge of FIG. 1. The illustrated roll seam 16 circumscribes the filter cartridge 10 radially separated from the end cap 12 to define an annular space 20. The roll seam 16 includes three portions that are radially outwardly displaced relative to the central axis A of the cartridge (and the remaining portions of the roll seam) to form retention tabs 24. The retention tabs 24 are illustrated as being equiangularly arranged on the circumference of the roll seam and of equal angular extent and radial displacement. Three roll seam portions 23 extend between the retention tabs 24. In the illustrated embodiment, each of these portions 23 of the roll seam includes a radially inwardly displaced segment 22. The inwardly displaced segments 22 provide an additional component of a peripheral cartridge compatibility matrix. The inwardly displaced segments 22 of the roll seam 16 on the exemplary filter cartridge 10 are diametrically opposed to each retention tab 24.

Inward and outward displacement of the roll seam relative to its generally circular "as formed" configuration result in a peripheral shoulder having a serpentine configuration. This complex shape is advantageously located at the radial outer periphery of the filter cartridge 10. As will be discussed in greater detail below, a compatibility matrix comprising a serpentine, or convoluted outer periphery of the filter cartridge presents unique opportunities for blocking reception of cartridges that omit components of the compatibility matrix. Further, inward and outward displacement of the roll seam 16 relative to the central axis A of the cartridge defines an annular space 20 having a variable radial dimension when measured perpendicular to the cartridge axis A, as best seen in FIG. 2. The shape of the annular space 20 may be used as part of a cartridge compatibility matrix when the cartridge 10 is mounted to a base by a collar. In accordance with a further aspect of the present invention, the outer profile of the roll seam 16 may used as a primary constituent of a cartridge compatibility matrix in the illustrated base embodiments where the roll seam is axially received by a fixed retaining structure.

Figure 3:
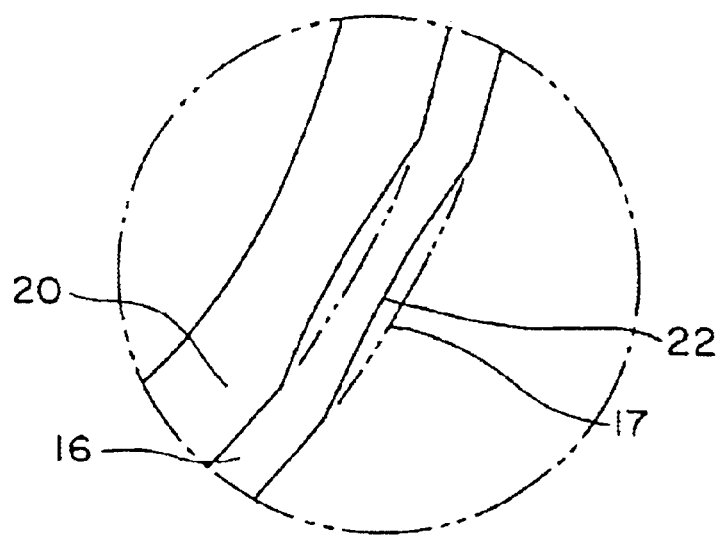
FIG. 3 is an enlarged view of an inwardly displaced segment of the roll seam of the filter cartridge of FIG. 2.

FIG. 3 illustrates an enlarged view of an inwardly displaced segment 22 of the roll seam 16. In the illustrated embodiment, the inward displacement of the roll seam is in the form of an arc having a radius of curvature of approximately 2.5" and a center of curvature located outside the roll seam 16. The inward deformation displaces the roll seam 16 inwardly from its normal radius of curvature 17 (illustrated by the dashed line in FIG. 3) by a distance in the range of 0.02" to 0.05" at the center of the deformation. The inwardly displaced segment has a length of approximately 0.5" measured along the circumference of the roll seam.

Figure 5:
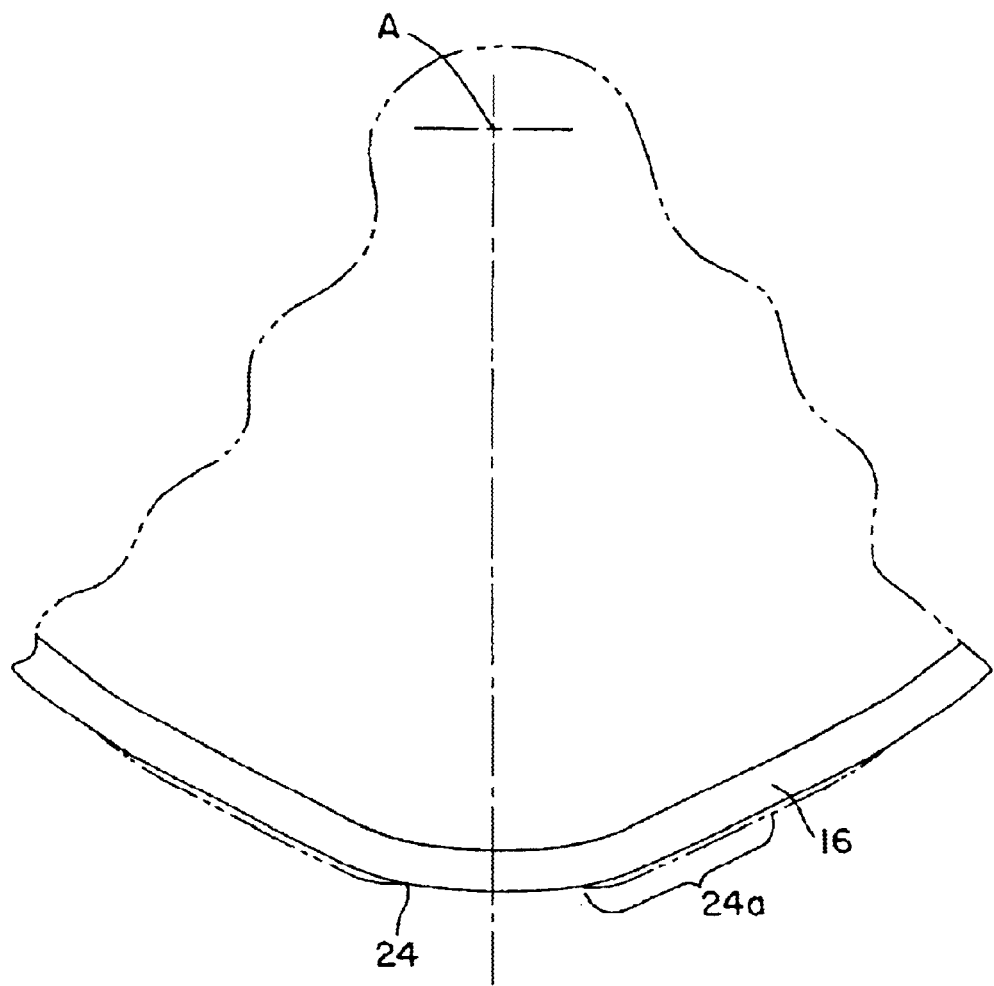
FIG. 5 is an enlarged portion, partly in diagrammatic form, of the filter cartridge shown in FIG. 2 illustrating a retention tab formed from an outward deformation of the roll seam.
Figure 6:
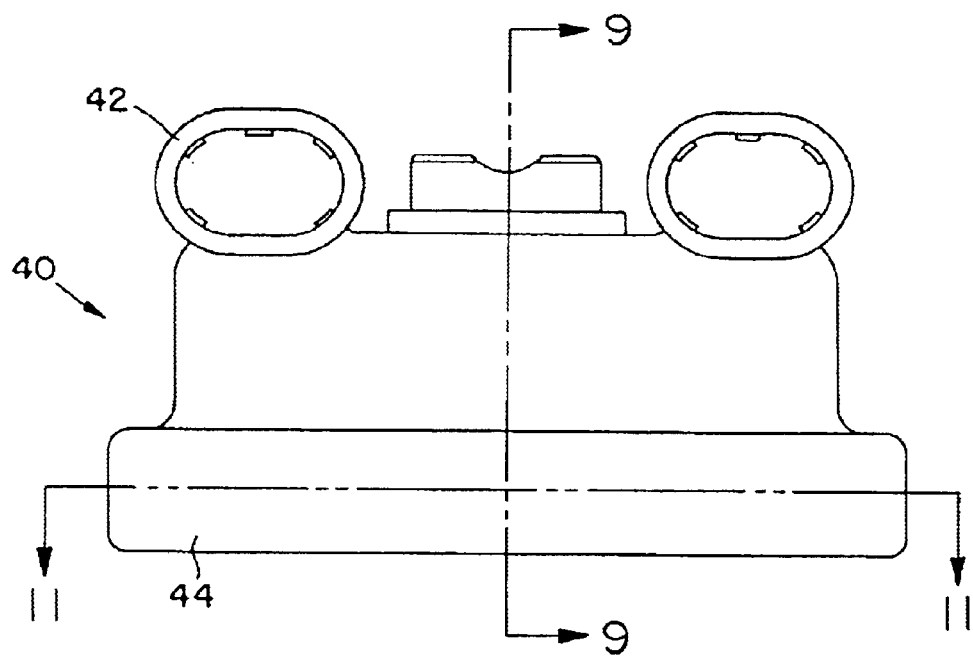
FIG. 6 is a front view of a portion of a first filter base component configured to receive the filter cartridge of FIG. 1.
Figure 7:
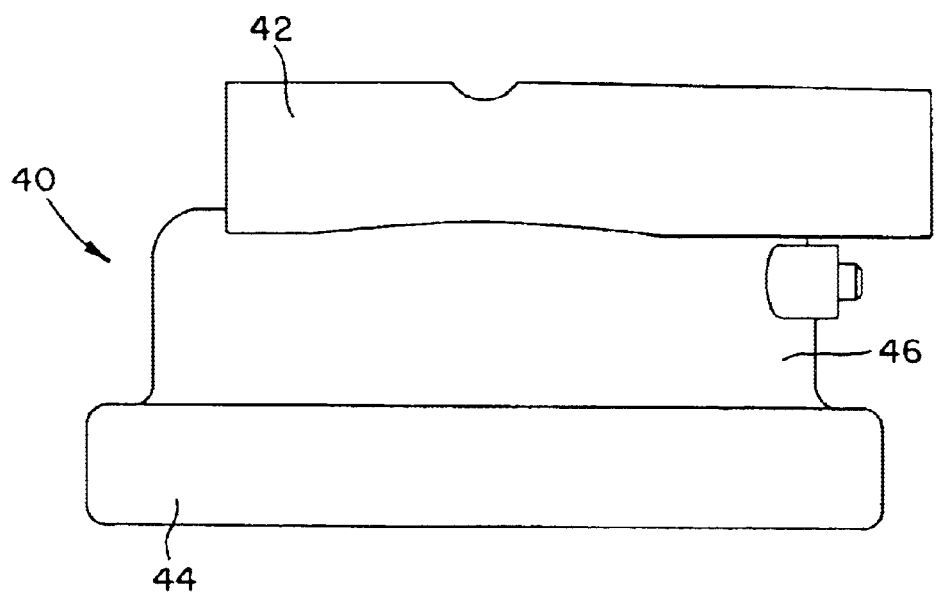
FIG. 7 is a side view of the filter base component of FIG. 6.
Figure 8:
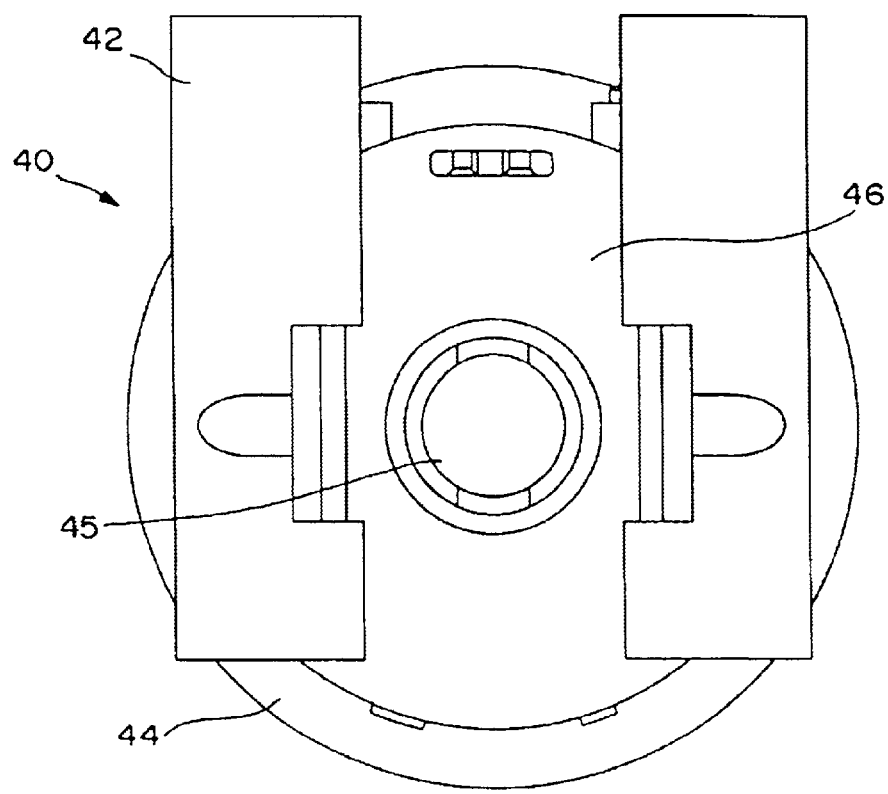
FIG. 8 is a top view of the filter base component of FIG. 6.
Figure 9:
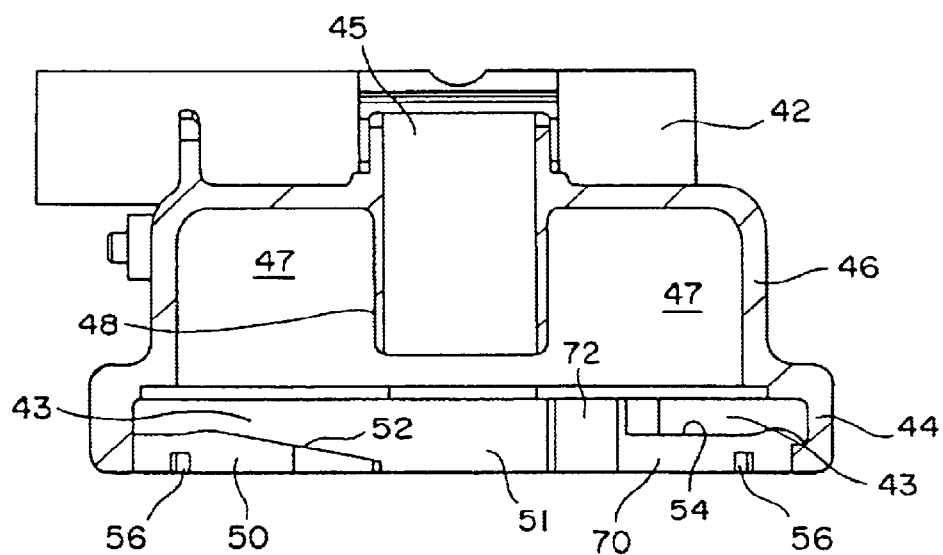
FIG. 9 is a sectional view of the filter base component of FIG. 6, taken along line 9—9 thereof.
Figure 10:
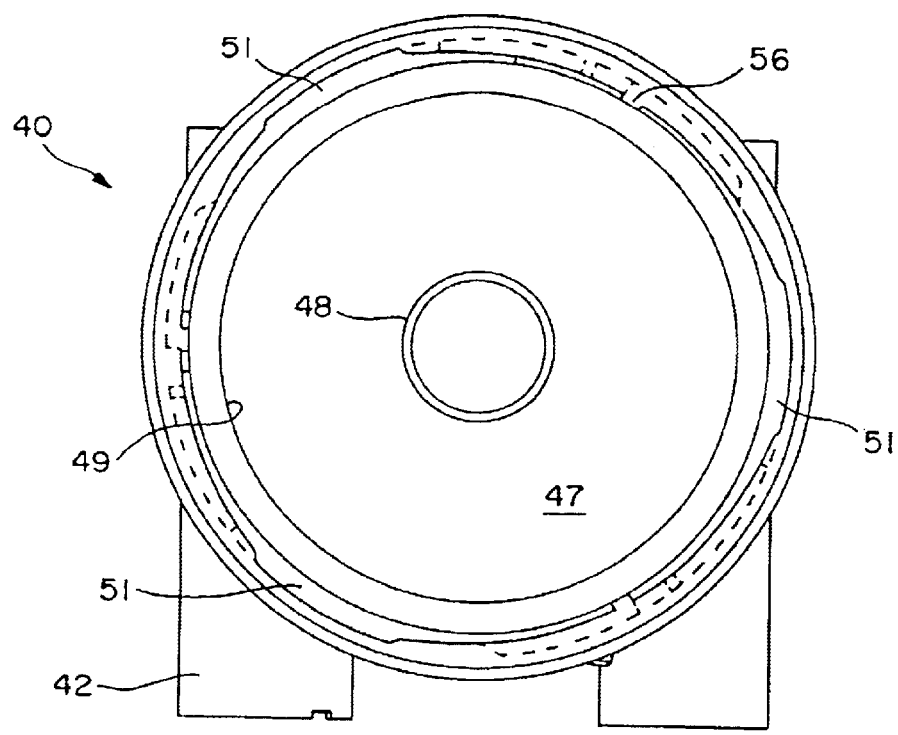
FIG. 10 is a bottom view, partly in phantom, of the filter base component of FIG. 6.
Figure 11:
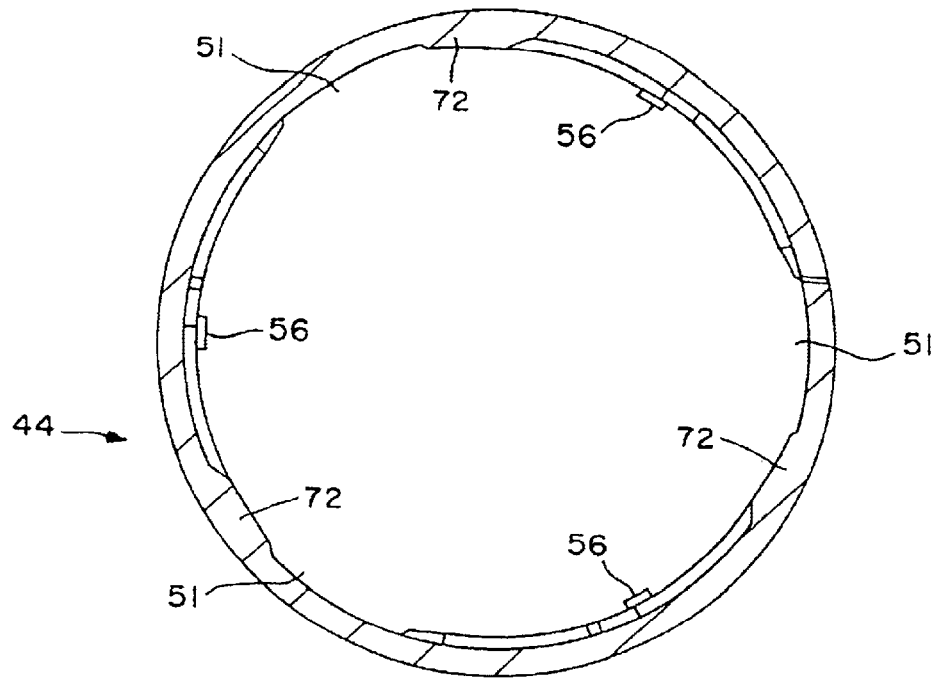
FIG. 11 is a sectional view of the filter base component of FIG. 6, taken along line 11—11 thereof.

FIG. 5 is an enlarged portion of FIG. 2 illustrating the outward displacement of the roll seam 16 to form a retention tab 24. The roll seam is radially outwardly displaced by a distance of approximately 0.08" relative to adjacent portions of the roll seam or a distance approximately equivalent to the radial thickness of the roll seam 16. Each retention tab 24 of the illustrated embodiment maintains its maximum outward displacement (of approximately one roll seam thickness) for approximately 0.5". It will be appreciated that the roll seam 16 includes transitional portions 24a adjacent either end of the retention tabs. The roll seam 16 between the retention tabs 24 (including their transitional portions 24a) and the inwardly displaced segments 22 maintains a substantially constant radius of curvature centered on the cartridge axis A.

It should be noted that inward and outward displacement of the roll seam may alter the configuration of the filter cartridge end cap 12 and second section 14. As best seen in the right-hand portion of FIG. 1, the housing second section 14 is displaced outwardly at 13 adjacent the outwardly displaced portion 24 of the roll seam 16. Further, outward displacement of the roll seam 16 causes a portion 12a of the generally cylindrical wall of the end cap 12 to be displaced outwardly as indicated by arrow C relative to a line 12b parallel to central axis A. The outward deformation of the end cap 12 increases as the cylindrical wall axially progresses toward the housing second section 14 (see FIG. 1). This outward deformation of the end cap 12 is greatest at the center of the outwardly displaced portions 24 of the roll seam 16. As a result, the wall of the end cap 12 is deformed to a non-cylindrical configuration in which the wall tapers gradually outwardly at locations centered on each outwardly displaced portion 24 of the roll seam 16. There are three such outward deformations 12a in the illustrated embodiment 10.

FIGS. 6–11 illustrate one embodiment of a base component 40 of a base configured to receive the filter cartridge 10 illustrated in FIGS. 1–5. The illustrated component 40 may be a molded member with integrally extending bracket portions 42. The bracket portions 42 are configured to receive a reinforcing metal sleeve (not shown) through which an attachment bolt (not shown) retains the filter base to a support structure (not shown). Below the bracket portions 42, the illustrated base component 40 comprises a generally cylindrical receptacle wall 46 that defines a receptacle 47 for axially receiving the filter cartridge end cap 12. An axial central conduit 48 of the base component 40 is received and sealingly engaged by a grommet 30 of an installed filter cartridge 10. The receptacle wall 46 flares radially outwardly to define a fixed integral retainer or outer ring 44. The retainer 44 comprises three axial slots 51 complementary to the radially projecting retention tabs 24 on the cartridge 10. The axial slots 51 communicate with retaining channel portions 43 partially defined by the upper surface of retaining lip portions 70. The upper surface of each lip portion 70 comprises a ramp 52 and a seat 54.

The end cap 12 and roll seam 16 of the filter cartridge 10 are axially received into the receptacle 47 and fixed retainer 44 until the retaining tabs 24 are aligned with the retaining channel portions 43. The cartridge 10 is then rotated clockwise relative to the base. During rotation, the retaining tabs ride up and over the ramps 52 into seats 54 defined by the retaining lip upper surface. A resilient radial extension 34 of the cartridge grommet 30 biases the cartridge 10 away from the base component 40 so that the seated retention tabs 24 resist unintended counterclockwise rotation of the cartridge 10 relative to the base. Each retaining channel portion 49 is terminated by an axially extending stop 72 (best seen in FIGS. 9 and 11).

In accordance with an aspect of the present invention, the retainer lip portions or first blocking means 70 projecting radially inward from the outer ring have an inward-facing profile including radially inward projecting protrusions or second blocking means 56 corresponding to the location of each inwardly displaced segment 22. The protrusions 56 are annularly spaced from the axial slots 51 defined between retainer lip portions 70, the location of which correspond to the retention tabs 24. The axial slots 51 and lip portions 70 with protrusions 56 code the base component 40 for a filter cartridge such as cartridge 10 with a roll seam having a compatible pattern of retention tabs 24 and inwardly displaced segments 22. The roll seam 16 of a compatible filter cartridge is axially received through the opening defined by the retaining lip portions 70, permitting complete axial reception of the end cap 12 into the receptacle 47. Subsequent angular rotation of the cartridge mounts the cartridge to the base. An incompatible cartridge (lacking, for example, the requisite inwardly displaced segments 22) is blocked from axial reception and cannot be mounted to the coded base 40.

A further aspect of the present invention contemplates a filter cartridge compatibility matrix comprising retention tabs 24 and inward displaced segments 22 of the roll seam as described above and further including radial protrusions 28 of the cartridge housing end cap 12. In the illustrated embodiment of a filter base component 40, a ring (not shown) is keyed to the base component to define an entrance to the receptacle 47. The ring includes openings that allow axial passage of the radial protrusions 28 of the end cap 12. Once the radial protrusions 28 are axially past the ring, the receptacle 47 of the base component 40 permits rotation of the cartridge relative to the base. Radial protrusions 28 of the end cap 12 may be used as an additional component of the cartridge compatibility matrix. The radial protrusions may also be employed to ensure a particular installed orientation of the cartridge 10 relative to the base component 40.

While preferred embodiments of the present invention have been set forth for the purposes of illustration, the foregoing descriptions should not be deemed a limitation of the invention herein. Accordingly, various modifications, adaptations and alternatives may occur to one skilled in the art without departing from the spirit and the scope of the present invention.

What is claimed is:
1. A filter assembly comprising:
   a filter cartridge comprising:
      a filter element extending between axially separated first and second ends;
      a housing end cap having a first diameter, defining a portion of a cylindrical space and supporting the first end of the filter element, said housing end cap having a first end defining an axial opening, a generally cylindrical side wall extending from the first end to a second end including a U-shaped bend; and
      a housing second section defining a portion of the cylindrical space, said housing second section having a first end joined to the housing end cap second end by a roll seam, the second end of the housing second section surrounding the second end of the filter element,
      wherein said roll seam has a generally circular configuration at a first radial distance from a central axis, a plurality of retention tabs defined by portions of the roll seam that are outwardly displaced relative to said first radial distance to a second radial distance and at least one segment of the roll seam that is inwardly displaced relative to said first radial distance to a third radial distance; and
   a base for mounting the filter cartridge to filter a flow of fluid delivered to and retrieved from said filter cartridge through said base, said base comprising:
      a receptacle wall defining a generally cylindrical receptacle, said receptacle wall flaring radially outwardly to define an integrally extending retainer, said retainer comprising:
         an outer ring;
         a plurality of retaining lip portions inwardly projecting from said outer ring, each of said retaining lip portions angularly spaced from an adjacent retaining lip portion to define a plurality of axial slots, each of said retaining lip portions having a radially inward facing profile at a radial distance from a central axis, at least one of said inward facing profiles being interrupted by a radially inward projecting protrusion, wherein said axial slots are complementary to a location and second radial distance of said retention tabs, said inward facing profiles being complementary to the first radial distance of the generally circular portions of said roll seam and said inward projecting protrusion being complementary to the location and third radial distance of said at least one inwardly displaced segment such that said roll seam axially passes said retaining lip portions without interference, and upon subsequent angular rotation of said cartridge relative to the base, each of said retention tabs is engaged in a respective retaining channel portion defined axially above each said retaining lip portion.

2. The filter assembly of claim 1, wherein said plurality of retention tabs comprises three equiangularly spaced retention tabs and said plurality of lip portions comprises three retaining lip portions.

3. The filter assembly of claim 1, wherein said plurality of retention tabs comprises three equiangularly spaced retention tabs, said at least one inwardly displaced segment comprises three inwardly displaced segments, each inwardly displaced segment diametrically opposed to one of the retention tabs and said retaining lip portions comprises three retaining lip portions, the inward-facing profile of each retaining lip portion including an inward projecting protrusion corresponding to the location and third radial distance of one of the inwardly displaced segments.

4. The filter assembly of claim 1, wherein said base comprises a header defining fluid flow passages for delivery of fluid to be filtered to and retrieval of filtrate from said filter cartridge and each of said retainer lip portions comprises an upper surface defining a ramp and a seat angularly adjacent said ramp, said seat having an axial distance from said header greater than an adjacent portion of said ramp.

5. The filter assembly of claim 4, wherein said filter cartridge comprises a resilient member arranged to bias the cartridge away from said base, thereby biasing said retention tabs into said seats.

6. The filter assembly of claim 1, wherein each of said retaining channel portions communicates with a respective said axial slot and is separated from another one of said axial slots with which it does not communicate by a stop inwardly projecting from said outer ring.

7. A base for mounting a filter cartridge, said base comprising:
   a header portion defining fluid flow passages for delivery of fluid to be filtered to and retrieval of filtrate from a filter cartridge receivable in the base;
   a receptacle wall integrally axially projecting from said header portion to define a generally cylindrical receptacle, an axial terminus of said receptacle wall flaring radially outwardly to define a fixed retainer, said retainer comprising:
      an outer ring;
      a plurality of retaining lip portions projecting radially inwardly from the outer ring and angularly separated to define a plurality of axial slots, each of said retaining lip portions having a generally arcuate inward facing profile at a first radius of curvature,
   wherein the inward facing profile of at least one of said retaining lip portions includes an inward protrusion.

8. The base of claim 7, wherein said inward protrusion is diametrically opposed to one said axial slot.

9. The base of claim 7, wherein said plurality of retaining lip portions comprise three retaining lip portions angularly spaced to define three axial slots.

10. The base of claim 9, wherein the inward facing profile of each said retaining lip portion comprises an inward protrusion.

11. The base of claim 7, wherein each said retaining lip portion comprises an upper surface defining a ramp and a seat angularly adjacent said ramp, said seat having an axial distance from said header greater than an adjacent portion of said ramp.

12. The base of claim 7, comprising a radially inward projecting annular shoulder axially intermediate said retainer and said receptacle, and each said retaining lip portion comprises an upper surface defining a ramp and a seat angularly adjacent said ramp, said seat having an axial distance from said header greater than an adjacent portion of said ramp, wherein a retaining channel portion is defined between said annular shoulder and the upper surface of each said retaining lip portion.

13. The base of claim 12, wherein each said retaining channel portion communicates with a respective said axial slot at a location adjacent a respective said ramp.

14. The base of claim 12, wherein each said retaining channel portion communicates with a respective said axial slot at a location adjacent a respective said ramp and each said retaining channel portion is angularly separated from another said axial slot by a stop adjacent the respective seat and radially inwardly projecting from said ring.

15. A base for mounting a filter cartridge, said base comprising:
   a header portion defining fluid flow passages for delivery of fluid to be filtered to and retrieval of filtrate from a filter cartridge receivable in the base;
   a receptacle wall integrally axially projecting from said header portion to define a generally cylindrical receptacle, an axial terminus of said receptacle wall flaring radially outwardly to define a fixed retainer, said retainer comprising:
      an outer ring;
      a plurality of first blocking means projecting radially inwardly from said outer ring, said first blocking means being angularly spaced from each other to define axial slots; and
      at least one second blocking means projecting radially inwardly from said first blocking means,
   wherein said outer ring, first and second blocking means define an axial entrance to said retainer.

16. The base of claim 15, wherein said at least one second blocking means is diametrically opposed to one said axial slot.

17. The base of claim 15, wherein said plurality of first blocking means comprise three of said first blocking means angularly spaced to define three of said axial slots.

18. The base of claim 15, wherein each said first blocking means comprises an upper surface defining a ramp and a seat angularly adjacent said ramp, said seat having an axial distance from said header greater than an adjacent portion of said ramp.

19. The base of claim 15, comprising a radially inward projecting annular shoulder axially intermediate said retainer and said receptacle, and each said first blocking means comprises an upper surface defining a ramp and a seat angularly adjacent said ramp, said seat having an axial distance from said header greater than an adjacent portion of said ramp, wherein a retaining channel portion is defined between said annular shoulder and the upper surface of each said first blocking means.

20. The base of claim 19, wherein each said retaining channel portion communicates with one said axial slot at a location adjacent said ramp.

21. The base of claim 19, wherein each said retaining channel portion communicates with a respective said axial slot at a location adjacent said ramp and each said retaining channel portion is angularly separated from another said axial slot by a stop adjacent the respective seat and radially inwardly projecting from said ring.

* * * * *